(12) United States Patent
Ahtonen

(10) Patent No.: US 10,926,979 B2
(45) Date of Patent: Feb. 23, 2021

(54) LIFTING SYSTEM FOR ELONGATED OBJECTS

(71) Applicant: Kauko Ahtonen, Joensuu (FI)

(72) Inventor: Kauko Ahtonen, Joensuu (FI)

( * ) Notice: Subject to any disclaimer, the term of this patent is extended or adjusted under 35 U.S.C. 154(b) by 323 days.

(21) Appl. No.: 16/106,283

(22) Filed: Aug. 21, 2018

(65) Prior Publication Data
US 2019/0062125 A1 Feb. 28, 2019

(30) Foreign Application Priority Data

Aug. 23, 2017 (FI) .................................... 20175750

(51) Int. Cl.
| | |
|---|---|
| *B66C 1/48* | (2006.01) |
| *B25J 15/02* | (2006.01) |
| *B65G 57/18* | (2006.01) |
| *B21D 43/00* | (2006.01) |
| *B66C 13/46* | (2006.01) |
| *B66C 1/10* | (2006.01) |
| *B66C 17/06* | (2006.01) |

(52) U.S. Cl.
CPC .............. *B66C 1/48* (2013.01); *B21D 43/006* (2013.01); *B25J 15/0253* (2013.01); *B65G 57/18* (2013.01); *B66C 1/10* (2013.01); *B66C 13/46* (2013.01); *B66C 17/06* (2013.01)

(58) Field of Classification Search
CPC ...... B65G 47/24; B65G 47/244; B65G 57/18; B65G 57/186; B66C 1/10; B66C 1/48; B66C 1/54; B66C 1/56; B66C 13/46; B66C 17/06; B66C 17/18; B25J 15/0047; B25J 15/0253; B25J 9/0093; B21D 43/006
See application file for complete search history.

(56) References Cited

U.S. PATENT DOCUMENTS

| | | | |
|---|---|---|---|
| 2,584,801 A | * | 2/1952 | Handforth ............... B25B 27/02 294/97 |
| 2,906,555 A | | 9/1959 | Heppenstall, Jr. |
| 3,254,776 A | | 6/1966 | Brown |

(Continued)

FOREIGN PATENT DOCUMENTS

DE          79 09 897          8/1979

OTHER PUBLICATIONS

Search Report for FI20175750 dated Mar. 8, 2018, 2 pages.
Search Report issued in EP Appln. No. 18189234.0 dated Feb. 4, 2019.

*Primary Examiner* — Dean J Kramer
(74) *Attorney, Agent, or Firm* — Nixon & Vanderhye PC

(57) ABSTRACT

The invention relates to a lifting system for lifting elongated objects, comprising a sensor device arranged to identify position and location of an elongated object, a lifting and rotating device, and a control unit for controlling the movement of the lifting and rotating device in response to signals from the sensor device which indicate the position and location of the object. In order to lift elongated objects regardless of object's material, profile or position, the lifting and rotating device is provided with an elongated gripping device including a first gripping arm, and the control unit is configured to control the lifting and rotating device to insert a part of the first gripping arm into the object from one end of the object in order to lift and rotate the object with the inserted part.

6 Claims, 3 Drawing Sheets

(56) References Cited

U.S. PATENT DOCUMENTS

| | | | |
|---|---|---|---|
| 3,545,629 A * | 12/1970 | Boers | B66C 1/125 |
| | | | 414/756 |
| 5,366,340 A | 11/1994 | Vo et al. | |
| 5,471,738 A * | 12/1995 | Burcham | B23P 11/025 |
| | | | 29/701 |
| 2007/0080549 A1 | 4/2007 | Jenney | |
| 2012/0155998 A1 * | 6/2012 | Verroeye | B65G 57/18 |
| | | | 414/618 |

\* cited by examiner

LIFTING SYSTEM FOR ELONGATED OBJECTS

This application claims priority to FI Patent Application No. 20175750 filed Aug. 23, 2017, the entire contents of which are hereby incorporated by reference.

BACKGROUND OF THE INVENTION

Field of the Invention

This invention relates to a lifting system for elongated objects.

Description of Prior Art

Prior art lifting of elongated objects have been frequently done by hand. This poses a potential safety hazard as the person performing the task is exposed to injuries due to repetitive monotonous movements and potentially sharp edges of the elongated objects.

Due to potential safety hazards, automated lifting systems are preferred over manual lifting. For example, suction pads, magnets or grab bridge cranes can be used to grab the elongated object for lifting to the following process sequence. Using any of the prior art solutions sets certain limitations for the elongated objects. For example, suction pad requires a sufficiently large contact area with the object for successful operation. This may also require the object to be in a correct position so that sufficient contact area is available. Magnets on the other hand can only be used to lift magnetic materials. Furthermore, selecting an individual object for lifting from a bundle of objects can be challenging by using, for example, a grab bridge crane, as the objects frequently are proximate to one another.

Due to the above mentioned drawbacks, prior art lifting systems or moving elongated objects by hand are not suitable options in case of bundled, non-magnetic objects with insufficient surface contact area and random position.

SUMMARY OF THE INVENTION

An object of the present invention is to solve the above mentioned drawbacks and to provide a lifting system able to lift any elongated object regardless of its material, position or cross-sectional profile. This object is achieved with a lifting system according to independent claim 1.

Using a sensor device capable of identifying the position and location of the elongated object in combination with a lifting and rotating device capable of inserting part of a first gripping arm into the elongated object from one of its ends, rotating it to the correct position and lifting it allows to lift elongated objects with any random position regardless of the material the object is made of.

Preferred embodiments of the invention are disclosed in the dependent claims.

BRIEF DESCRIPTION OF DRAWINGS

In the following, the present invention will be described in closer detail by way of example and with reference to attached drawings, in which.

DESCRIPTION OF AT LEAST ONE EMBODIMENT

In the following it is by way of example assumed that the lifting system lifts metallic profiles. However, it should be observed that this is only one example of an object which can be lifted with the lifting system.

Metallic profiles are used in a wide range of industrial applications and to manufacture consumer goods. One such application is a window frame. These profiles may have various cross-section shapes, may be fully or partially hollow and may be up to 6 m or more in length prior to sectioning. Handling of these long profiles before sectioning may be challenging.

Figure 1:
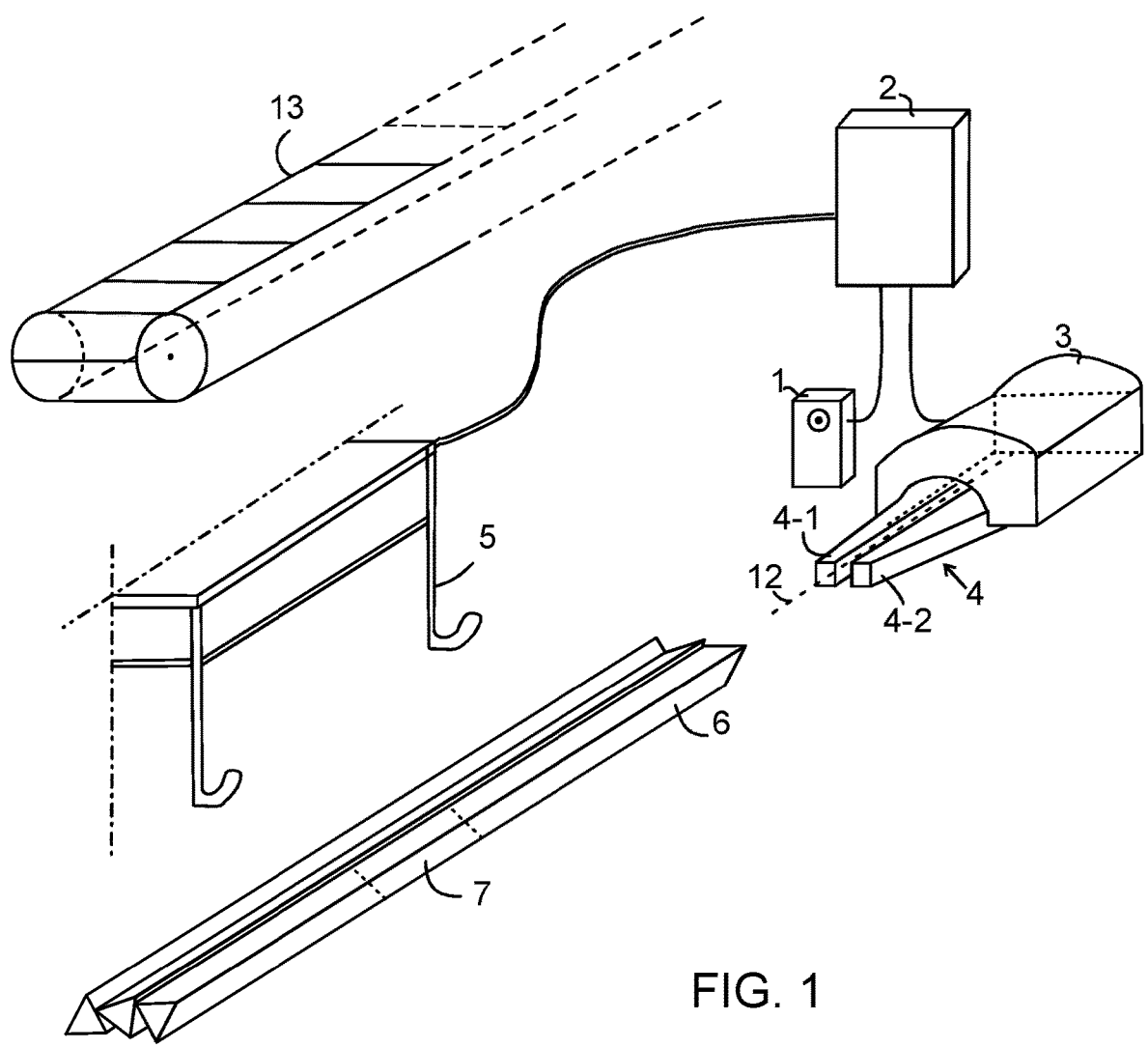
FIG. 1 illustrates an overall view involving a lifting system.

FIG. 1 is an overall view of the lifting system involving a sensor device 1, a control unit 2, a lifting and rotating device 3 with an elongated gripping device 4, a moving device 5, and a conveyor device 13. FIG. 1 also illustrates an elongated object 6 to be moved. By using such a lifting system manual labor can be minimized in this process step and elongated objects regardless of their material composition, cross-section shape and position can lifted and moved. It should be noted, however, that a similar lifting system may also be utilized for other purposes.

Figure 3A:
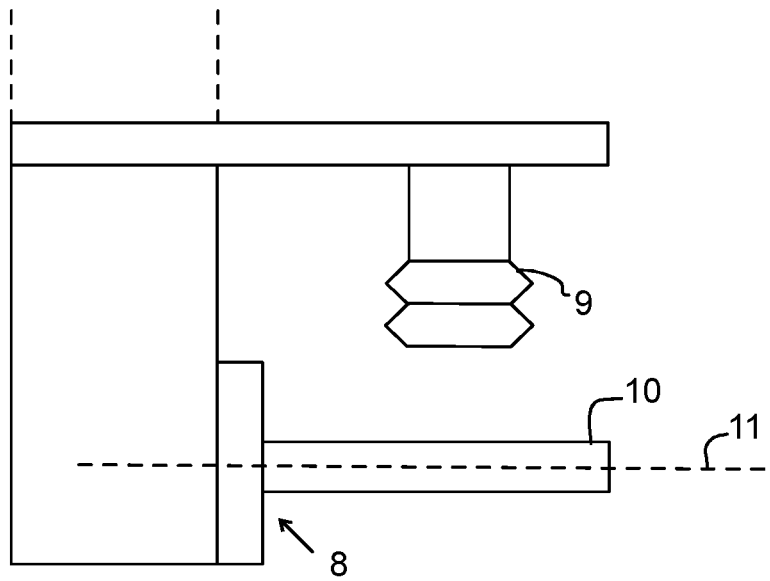
FIGS. 3a and 3b illustrate the wrap removing device.
Figure 3B:
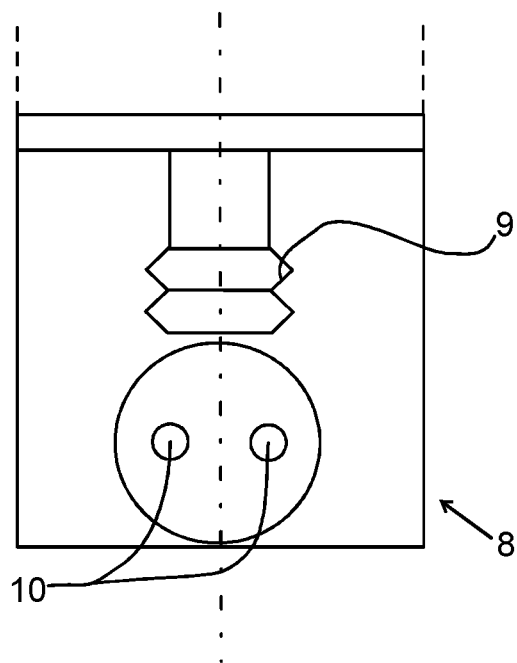

In the case of, for example, elongated aluminum profiles, the profiles are delivered in relatively large bundles wrapped in plastic or other wrapping material. In one preferred embodiment of the invention, the lifting system is equipped with a wrap removing device 8, as illustrated in FIGS. 3a and 3b. This device can be designed to remove the wrapping around a bundle of elongated objects. One implementation of such a device includes a suction pad 9 for attaching onto plastic wrapping on a bundle and stretching the plastic wrapping upwards from between at least two horizontally protruded, elongated rods 10. After the plastic wrapping has been stretched above the rods, the rods start to revolve around a mutual axis 11 causing the plastic wrapping to form a coil around the elongated rods 10. The plastic coil can then be moved for further processing.

The sensor device 1 comprises, for example, a camera system able to identify the shape, location and position of one end of the elongated object. After removing the wrapping, the objects, which in this example are assumed to be profiles, are arranged in a random position due to lack of support from wrapping. The sensor device 1 can be programmed to identify various different cross-section shapes and their position and location, and this data can be used to guide the lifting and rotating device 3 to the location of the elongated object 6 best suitable for lifting.

The lifting and rotating device 3 is preferably equipped with a gripping device 4. The gripping device 4 consists of at least a first gripping arm. The gripping arm may be preferably designed to be elongated and flat. A single gripping arm, with suitable edges and chamfers, designed to be inserted in and attached to the inner surface of an elongated object 6, may be used in a production line handling selected cross-sectional shapes. Using only one gripping arm also simplifies the design.

If objects with a plurality of mutually different cross-sectional shapes are handled, a single gripping arm may not be sufficient, as the shape of one gripping arm may not apply to all profiles. In another embodiment of the invention, the gripping device may contain two or more elongated gripping arms 4-1 and 4-2, as illustrated in FIG. 1. By using two or more gripping arms, the gripping device can be used to grip onto several different profile shapes. The gripping arms of the elongated gripping device 4 can further be designed to move towards each other and away from each other in order to pinch onto the elongated object 6 which is located between them. During pinching one of the gripping arms may be located partially inside the object while the other one is entirely located on an outside of the object. In another embodiment, both gripping arms of the elongated gripping device may be inserted inside the elongated object, moved away from each other in order to pinch onto the inside wall of the elongated object for lifting and rotating.

The lifting and rotating device 3 is designed to move in all three dimensions in order to guide the elongated gripping device 4 to a selected elongated object 6. In addition, the gripping arms may be designed to revolve around a central axis 12 in order to rotate the gripped, elongated object 6 into an optimal position for the following processing sequence.

The movement of the lifting and rotating device 3, the moving device 5 and wrap removing device 8 can be controlled using a single control unit 2. Alternatively, the motion of each aforementioned device may be controlled by a separate control unit for each device. In any case, the control unit may be implemented with circuitry or a combination of circuitry and software. Electric motors, pressurized air or hydraulics or a combination of these may be used to provide motion to the devices mentioned above.

In FIG. 1, the position and location data of the elongated object 6 from the sensor device 1 is transferred to the control unit 2 which further sends signals with command data to the lifting and rotating device 3 in order to move the device in front of a selected elongated object 6, at least partially insert the elongated gripping arm of the elongated gripping device 4 into the elongated object 6, lift the object up approximately 100 mm and rotate it to a correct position. The lifting and rotating operation is illustrated in FIGS. 2*a* and 2*b*.

Figure 2A:
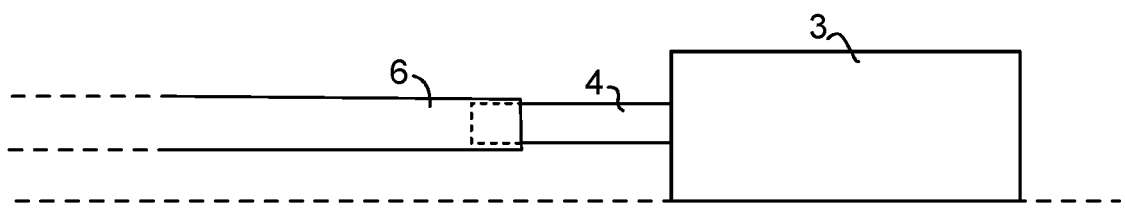
FIGS. 2a and 2b illustrate the lifting and rotating operation of the elongated object.
Figure 2B:
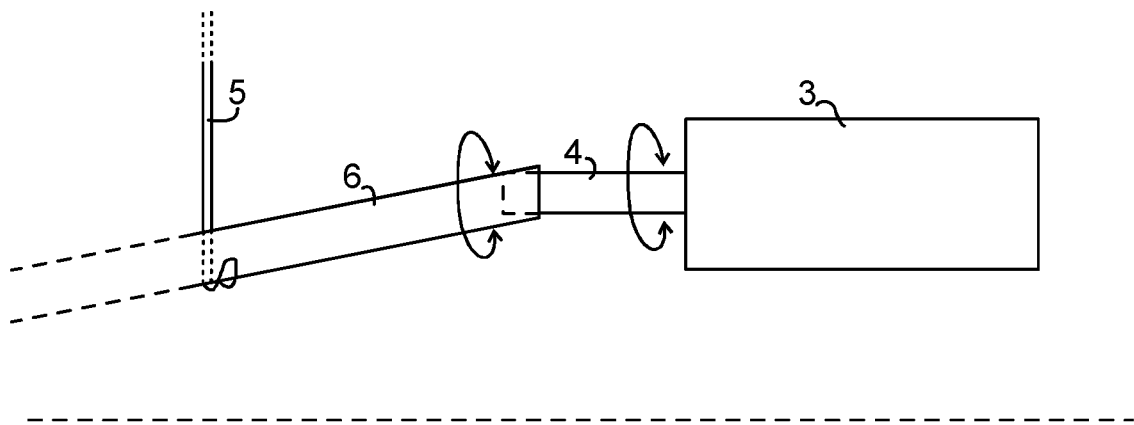

FIG. 2*a* illustrates the first step where the at least one elongated gripping arm is inserted in the elongated object. During the insertion the elongated gripping arm attaches to the inside walls of the elongated object in order to enable the rotation of the object in the following step. FIG. 2*b* illustrates the second step, where rotating and lifting device moves upwards thus lifting the elongated object, followed by a rotating motion in order to rotate the elongated object in the correct position.

After lifting and rotating the elongated object 6, the object is further lifted so that the moving device 5 can be placed underneath the middle section 7 of the elongated object 6. The lifting and rotating device 3 then lowers the elongated object 6, retracts from the elongated object 6, and returns to home position. The moving device 5 then transports the elongated object 6 to, for example, a conveyor device 13 which further transports the elongated object 6 to the next processing sequence, such as cutting. The moving device 5 may transport the elongated object 6 in transverse or axial direction or in any combination of these.

It is to be understood that the above description and the accompanying figures are only intended to illustrate the present invention. It will be obvious to a person skilled in the art that the invention can be varied and modified without departing from the scope of the invention.

The invention claimed is:

1. A lifting system for lifting elongated objects comprising:
   a sensor device arranged to identify position and location of an elongated object,
   a lifting and rotating device, and
   a control unit for controlling the movement of said lifting and rotating device in response to signals from the sensor device which indicate the position and location of the object, wherein
   said lifting and rotating device is provided with an elongated gripping device including a first gripping arm, and
   said control unit is configured to control the lifting and rotating device to insert a part of the first gripping arm into the object from one end of said object in order to lift and rotate the object with the inserted part, and wherein
   the lifting system further comprise a moving device arranged to be inserted under a middle section of the elongated object, lift the elongated object and move the elongated object transversally or axially.

2. A lifting system of claim 1, wherein
   the elongated gripping device has at least two or more elongated gripping arms configured to move and pinch on to the elongated object.

3. A lifting system of claim 1, wherein
   a conveyor device is arranged to receive and transport the elongated object to a following processing sequence after being lifted with said moving device.

4. A lifting system of claim 1, wherein
   the movement of said lifting and rotating device and said moving device is controlled by one control unit.

5. A lifting system of claim 1, wherein
   the movement of said lifting and rotating device and said moving device is controlled by a separate control unit for each device.

6. A lifting system of claim 1, wherein
   the said sensor device includes a camera.

* * * * *